Patented Mar. 14, 1939

2,150,436

UNITED STATES PATENT OFFICE 2,150,436

PREPARATION FOR THE TREATMENT OF WOOD AND OTHER BUILDING MATERIAL AND THE LIKE AGAINST THE ACTION OF WHITE ANTS AND OTHER INSECTS AND AGAINST WEATHERING

George Arthur Fry, Pietermaritzburg, Natal, Union of South Africa

No Drawing. Application October 20, 1936, Serial No. 106,532. In the Union of South Africa October 21, 1935

3 Claims. (Cl. 134—42)

This invention relates to an improved preparation for the treatment of timber and other building materials to preserve them against destruction by insects such as white ants or termites and against weathering.

It is known to treat timber and other building materials with tar or other materials containing this substance as the basic ingredient. The disadvantage however is that these substances become either sticky or flaky and in the latter state tend to peel off from the surface to which they are applied.

It is also known to mix tar with emulsifying agents such as soap, for use in the treatment of road surfaces and road making materials.

The present invention aims at providing an insect-repelling preparation by mixing certain substances with tar so that, when applied to a surface, the improved preparation besides adhering permanently thereto without peeling or flaking off, maintains its insect-repelling properties indefinitely.

According to the invention the improved preparation consists of tar mixed hot with a saponaceous substance, a stabilizer such as an aqueous extract of *Chondrus crispus* known as Irish moss and an aqueous extract of *Mesembryanthemum eduli* known as Hottentot fig leaves. The aqueous extracts of Irish moss and Hottentot fig leaves are in the nature decoctions of these substances and the saponaceous substance is soft soap which acts as an emulsifier for the tar.

By way of example a small quantity of the improved preparation is made up as follows using the ingredients in the proportions given.

Take

| | | |
|---|---|---|
| Stockholm tar | gallon | ½ |
| Soft soap | pound avoirdupois | 1 |
| Irish moss (extract) | pints | 2 |
| Hottentot fig leaves (extract) | pint | 1 |

All the above ingredients are intimately mixed hot to form a homogeneous mixture, at a temperature high enough to liquefy the tar. After cooling the preparation is ready for use and may be applied by means of a brush to the surface to be protected. When a spraying appliance is employed it is preferable to dilute or thin the preparation with a light oil such as paraffin or turpentine. On evaporation of the light oil a moist layer of the preparation is left adhering to the surface of the treated material.

The extracts of Irish moss and Hottentot fig leaves are in the nature of decoctions prepared by way of example in the following manner:

Irish moss extract

One pound avoirdupois of Irish moss is placed in a vessel containing three gallons of water. The water is kept simmering until, by evaporation, the quantity is reduced to two gallons when it becomes jellified.

Hottentot fig leaf extract

One pound avoirdupois of Hottentot fig leaves is placed in six pints of water the mixture being boiled down to five pints.

The heating of the tar breaks up its flakiness and adhesiveness and the soft soap prevents it from assuming these characteristics on cooling. The Irish moss extract assists in this action, while the Hottentot fig leaf extract by virtue of its hygroscopic properties helps to stabilize the solution and produce permanent emulsification, as well as acting as an insect repellant. On treating timber or other building materials with the improved preparation the pores are filled and a moist layer or film which adheres permanently to the surface and does not tend to peel or flake off even after long periods of use in exposed positions and thereby acts as a substantially permanent repellant against the depredations of termites.

It has been found that the best results are obtained by using a wood-tar such as that known as Stockholm tar, in preference to coal-tar. The improved preparation may be applied by brushing, spraying or impregnation by immersion.

What I claim is:

1. An improved insect repelling preparation for the treatment of timber and other building materials, comprising a hot mixed oil-in-water type emulsion of Stockholm tar with a saponaceous substance and aqueous extracts of *Chondrus crispus* known as Irish moss and *Mesembryanthemum eduli* known as Hottentot fig leaves.

2. An improved insect repelling preparation comprising an oil-in-water type emulsion as claimed in claim 1 wherein the aqueous extracts of Irish moss and Hottentot fig leaves are present in the form of decoctions of these substances and the saponaceous substance is soft coap.

3. An improved preparation comprising an oil-in-water type emulsion as claimed in claim 1, wherein the ingredients are in intimate mixture in the proportions substantially as follows: Stockholm tar one half gallon, soft soap one pound avoirdupois, Irish moss extract two pints and Hottentot fig leaf extract, one pint.

GEORGE ARTHUR FRY.